Figure 1:
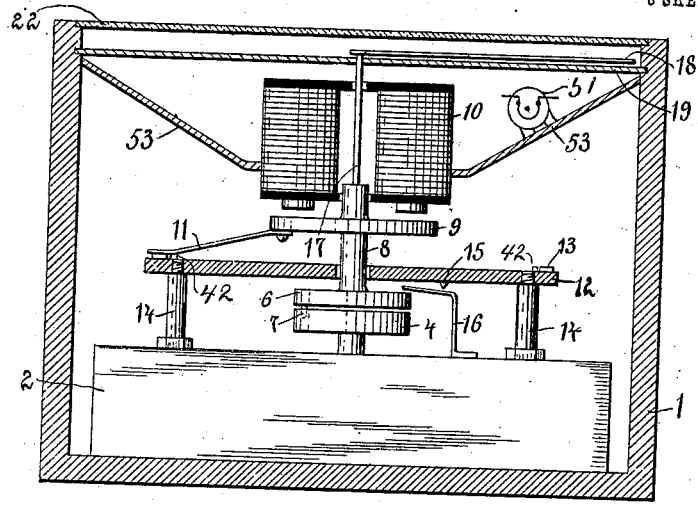

E. J. BURKE.
INDICATOR.
APPLICATION FILED AUG. 1, 1906.

906,100.

Patented Dec. 8, 1908.
3 SHEETS—SHEET 1.

WITNESSES
S. Herzog
V. N. Hopping

INVENTOR
Edward J. Burke
BY
ATTORNEY

E. J. BURKE.
INDICATOR.
APPLICATION FILED AUG. 1, 1906.

906,100.

Patented Dec. 8, 1908.
3 SHEETS—SHEET 2.

WITNESSES
S. Herzog
V. N. Hopping

INVENTOR
Edward J. Burke
BY
Faust F. Crampton
ATTORNEYS

E. J. BURKE.
INDICATOR.
APPLICATION FILED AUG. 1, 1906.

906,100.

Patented Dec. 8, 1908.
3 SHEETS—SHEET 3.

WITNESSES
S. Herzog
V. N. Hopping

INVENTOR
Edward J. Burke
BY
ATTORNEY

UNITED STATES PATENT OFFICE.

EDWARD J. BURKE, OF NEW YORK, N. Y.

INDICATOR.

No. 906,100.　　　Specification of Letters Patent.　　Patented Dec. 8, 1908.

Application filed August 1, 1906. Serial No. 328,816.

*To all whom it may concern:*

Be it known that I, EDWARD J. BURKE, a citizen of the United States, and a resident of the borough of Brooklyn, city of New York, State of New York, have invented new and useful Improvements in Indicators, of which the following is a specification.

My invention relates to indicators and it has for its object to provide a means for indicating when a line has been energized.

It also has for its object to provide a means for indicating the number of a calling party particularly in a telephone system and to greatly reduce the number of relays that are used in the systems now known in the art.

It also has for its object to provide an indicating means which will indicate any one of a number of jacks of a telephone system.

The invention consists in features disclosed in the following description, illustrated in the drawings and set forth in the claims.

Figure 2:
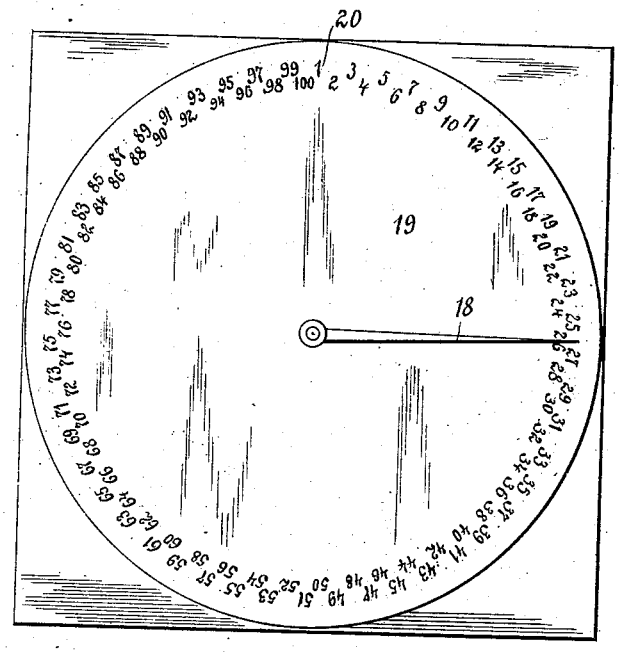
Figure 3:
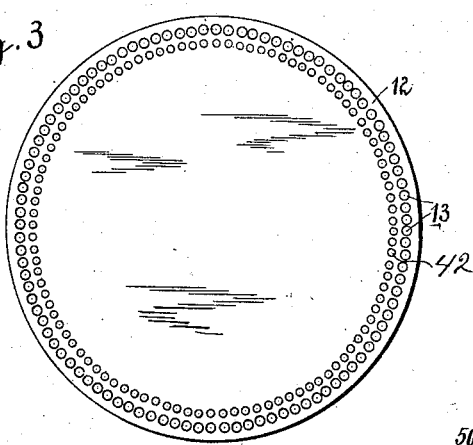
Figure 4:
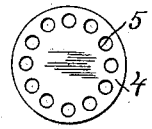
Figure 5:
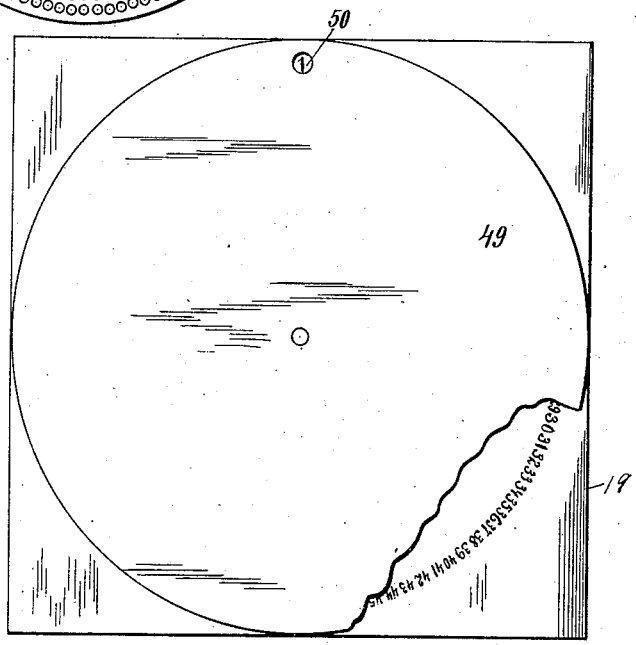
Figure 6:
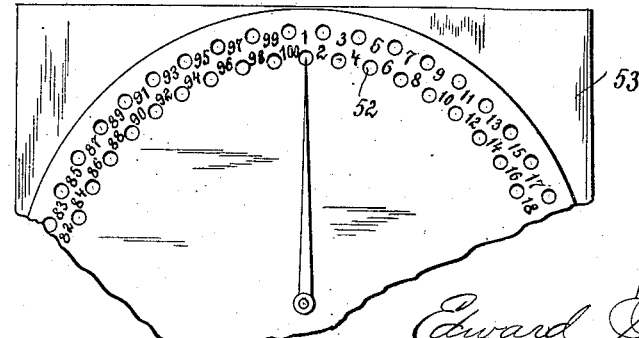
Figure 7:
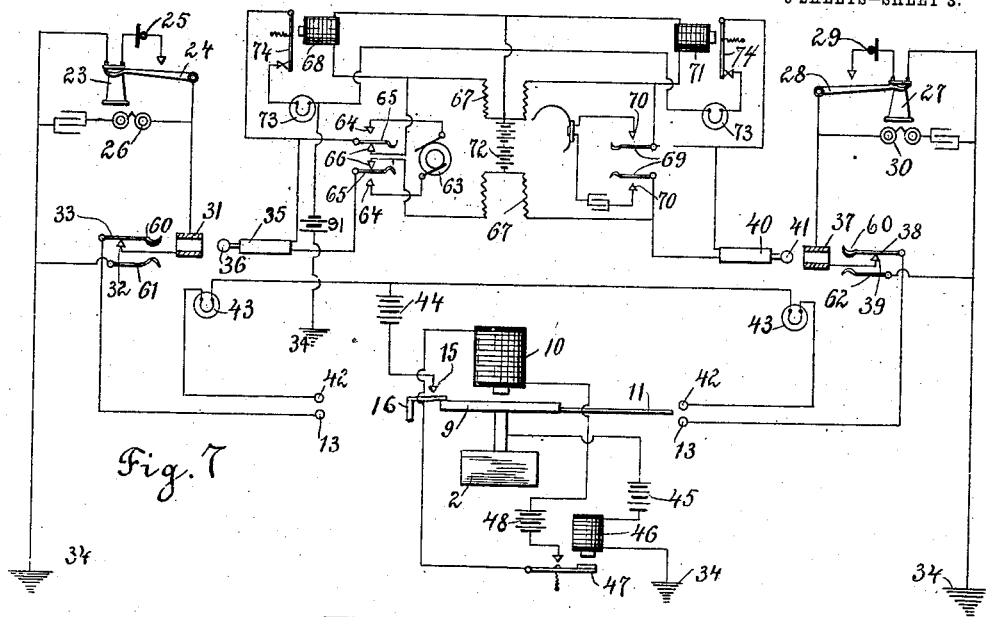
Figure 8:
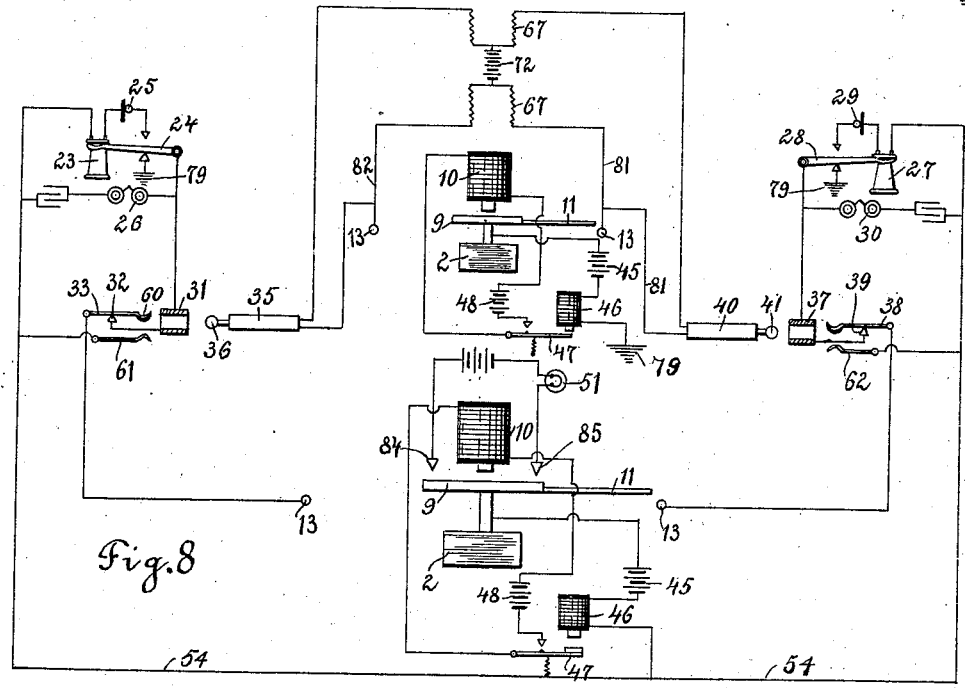

Referring to the drawings Figure 1 is a sectional view of the indicator. Fig. 2 is the top view of the dial plate and pointer. Fig. 3 is a top view of the contact plate. Fig. 4 is a part of the clutching mechanism. Fig. 5 illustrates a top view of a modification wherein the circular plate having a hole is substituted for the pointer. Fig. 6 illustrates a top view of another modification of my invention wherein the pointer points directly to the jack of the calling subscriber. Figs. 7 and 8 are diagrammatic illustrations of the connections used in applying my invention to the systems now used in the art of telephony.

1, Fig. 1 is a case for containing the indicating mechanism. This case may be located in any suitable place. If preferred it may be located in the lower part of the operator's board where the face of the indicator is in clear view of the operator. In the case 1 is located a motor 2. Any suitable type of the motor may be used. If it is desired a revolving shaft may be used in place of a number of motors in a multiple board telephone system to produce motion in connection with a number of indicators located in the same central station. The indicators may be connected and disconnected from the common motor in the same way that the device illustrated in the drawings is connected and disconnected and is hereinafter described. A shaft is connected to the motor 2.

4 is a clutch plate located on the end of the shaft. As shown in Fig. 4 the clutch plate 4 is provided with a plurality of holes 5 located circumferentially. Above the clutch plate 4 is suspended a second plate 6. A peg or pin 7 is located near the outer edge of the plate 6 and adapted to register and enter any one of the holes 5 of the plate 4. The plate 6 is mounted on a shaft 8. The shaft 8 is controlled by an armature-plate 9 located below a magnet 10. The armature 9 is provided with a contact arm 11 which is adapted to move over the contact plate 12 and the contacts 13 located thereon as shown in Fig. 3. The contact 11 is pliable so that it will maintain its connection with the contacts whether the armature is raised by the magnet 10 or not. The contact plate 12 is supported in the casing in any suitable manner such as by the uprights 14. The contact plate 12 is also provided with the contact 15 located on the lower side of the plate. The plate 6 operates on a spring contact 16 which is adapted to make contact with the fixed contact 15 when the armature 9 and the plate 6 are lifted.

To the shaft 8 is attached a rod 17 which carries a pointer 18. The pointer 18 moves over a dial plate 19. The dial plate is provided with a plurality of numbers 20. The numbers 20 correspond to the number of the calling subscribers which are directly in charge of the operator and correspond to the number of the jacks connected to the said subscribers. The numbers 20 also correspond to the contacts 13 which are located on the plate 12, these contacts also being connected through the jacks to the subscribers in charge of the operator. The plate 19 may be made of ground glass so that a light from a lamp may shine through the glass when the call is made by a subscriber in the manner described hereinafter. Above the pointer may be located a glass plate 22 if it is desired. The pointer 18 is normally connected through the shaft 8 and the clutch plates 4 and 6 to the motor 2 so that it is normally rotated. As soon, however, as the magnet 10 is energized by the means hereinafter described, it raises the disk armature 9 and causes the plate 6 to be separated from the plate 4 at the same time withdrawing the pin 7 from one of the holes 5. This disconnects the pointer 18 from the motor 2 and by reason of the friction of the contact 11 on the contacts 13 and 42, the pointer comes to an immediate stop pointing to one of the numbers 20 on the plate 19.

In Figs. 7 and 8 is shown my invention as applied to the telephone system as commonly used to-day. I have illustrated merely a single board system but it is understood that the invention may be applied to any telephone system.

In the drawing 23 indicates the receiver at one station. 24 indicates the switch hook, 25 the transmitter, 26 the bells or other signaling means. At the other station is located the receiver 27, the switch hook 28, the transmitter 29 and the signaling means 30. The stations are connected with the central and to the supply batteries as is frequently done in the systems known in the art. The station having receiver 23 is connected to jack ring 31 which is in turn connected to contact 32. The jack 31 is provided with a movable contact 33 which may be separated from the contact 32. The movable contact 33 is connected to one of the contacts 13 and is provided with an insulating portion 60. The subscriber's station is also connected to the bus connector 34 and contact 61. The jack 31 is adapted to register with the plug 35 and make contact therewith. The head 36 of the plug is adapted to raise the contact 33 and break its connection with the contact 32. The contacts 33 and 38 are provided with surfaces composed of insulating material 60 so that when the plugs are inserted in the jacks, a connection will not be established between the tips of the plugs and the said contacts.

The station having the receiver 27 is connected with the jack 37 having the movable contact 38 and the fixed contact 39. The contact 38 is connected with another of the contacts 13. The collar of the plug 40 is adapted to register with the collar of the jack 37 and the head 41 is adapted to lift the movable contact 38 so as to break its connections with the contact 39. The tip of the plug passes between the contacts 62 and 38, a connection being established between the tip of the plug and the lower of the two spring contacts. The spring contacts 61 and 62 being connected with the subscribers' stations. The subscribers' stations are thus connected to the plug circuit through the collars and contacts of the jacks and plugs in the manner well known in the art.

In the form of the device illustrated in Fig. 7 a second row of contacts 42 is located in the vicinity of the contacts 13 so that when the movable contact 11 makes connection with one of the contacts 13, it will also make a connection with a corresponding contact 42 as shown in Fig. 1. The contacts 42 are connected with lamps 43 which are also connected with the battery 44. The lamps 43 may be located in the vicinity of the jacks of the subscribers or they may be located below the ground glass plate 19 and below or in the vicinity of the numbers 20 located on the said plate 19. The battery 44 is connected with the contact 15. The armature 9 is connected to the battery 45. The battery 45 is connected to the magnet 46 which is also connected to the bus-bar 34. Magnet 46 operates on an armature 47 and is adapted to close a connection with a battery 48. The armature 47 is connected with the magnet 10.

The operation of the device is as follows. When one of the subscribers lifts the receiver, say for example receiver 27, the circuit of the main line connected to the subscriber is closed from the battery 45 through 46, 34, 27, 29, 28, 37, 39 and 38 to contact 13. This contact 13 is thus energized by its connection with the battery 45. When the contact 11 reaches the said contact 13 in its rotation a circuit is completed through 11 and 9 to the battery 45 whereupon the magnet 46 is energized, armature 47 is raised and a circuit is completed from battery 48 through 47 and 10 to battery 48. This energizes magnet 10 and causes it to lift armature 9 and to separate plates 4 and 6 so that the pin 7 is withdrawn. The armature and pointer 18 comes to a standstill at once and it remains in a fixed position and pointing to the number of the subscriber that is calling and whose station is connected to the said contact 13, say for example No. 37 the connection with the contacts being such that the connected contacts will correspond to the numbers on the dial and in the same order. The operator immediately picks up plug 40 and inserts it in the jack 37, that is, into the jack having the number pointed out. When the plug is inserted the connection between contact 13 and the subscriber's station is broken by the separation of the contacts 38 and 39. This causes magnets 46 and 10 to become deenergized and the clutch connects the pointer with the shaft and it continues to rotate until it comes in contact with another contact 13 which is connected with a subscriber having his receiver removed from the switch hook and in which no plug has been inserted. When the operator ascertains the number that is desired, he inserts the plug in the jack of the subscriber called for and communication is established in the manner well known in the art. The needle may be rotated at any required speed so that at the most but a fraction of a second may intervene between the time that the receiver is removed from the hook and the response thereto by the indicator. At the same time that a connection is made through contact 11 and contact 13 in response to a call from a subscriber's station, a current is also caused to flow from the battery 44 through the armature 9, contact 42, and the lamp 43 when the armature 9 is lifted. This causes the lamp 43 which corresponds to the station of the calling subscriber to light up. If it is desired the lamp 43 may be located under the number of the calling subscriber.

In the form of invention illustrated in Fig. 5, I have illustrated a moving circular plate 49 which has an opening 50. The moving plate 49 is located over the dial plate 19 and when the shaft is brought to a standstill by the operation of the magnet 10 but one figure appears through the opening in the plate. If it is desired a single lamp may be used instead of a number of lamps. This arrangement is shown in Fig. 8 and is used preferably in connection with the form of invention shown in Fig. 5. The lamp 51 is located below the dial plate 49 and whenever the armature 9 is pulled up it closes a circuit through the lamp 51 and the same lights up and shines through the opening. A reflector 53 may be provided which will cause the light to shine through the plate and a light will shine through the opening 50.

In the form of invention shown in Fig. 6 the pointer points to the jack of the calling subscriber so that the operator has merely to insert the answering plug into the jack that is pointed out by the pointer. In this form of the invention the jacks 52 are arranged in a circle and are located on and supported by the plate 53. The jacks are located above and below the numbers of the calling subscribers. When the pointer comes to a standstill it will point in the direction not only of the number of the subscriber but also in the direction of the jack of the calling subscriber. The operator then merely inserts the plug in the jack of such a subscriber in response to the indication of the pointer. The circuits of the plugs may be provided with the usual clearing out signal devices and the operator's ringing and talking keys that are usually found in the telephone systems well known in the art. I have illustrated one form of a plug circuit in Fig. 7.

The plug contacts 35 and 36 and 40 and 41 are connected to the contacts 65 and 69 and normally to the coils 67 and battery 72. The tips 36 and 41 of the plugs are connected to the upper of said contacts as shown in the arrangement of Fig. 7. Contacts 65 are normally in contact with the contacts 66 which are connected to the induction coils 67. The contacts 69 are adapted to make contact with the contacts 70 when the said contacts 69 are spread. The operator's telephone is connected to contacts 70 and may be connected across the subscriber's line by spreading contacts 69 in the manner well known in the art and the number called for can be ascertained.

The source 63 of the ringing current is connected to contacts 64 which are so disposed that the movable contacts 65 may make contact therewith when they are spread. The contacts 65 are connected to the plug 35 which is in turn connected to the subscriber's station when inserted in the jack. When the contacts 65 are spread a source 63 is connected with the subscriber's station and causes the bell on that station to ring. The circuits of the lamps 73 are controlled by the magnets 68 and 71. The lamps are lighted by the current from the battery 91. The circuit of one lamp 73 is from the battery to the busbar 34, contact 61, 36, 74, lamp 73 back to the battery. The corresponding circuit of the other lamp 73 passes through contacts 62 and 41.

The magnets 68 and 71 are high impedance magnets and are connected in multiple with the repeating coil 67. The magnets and coil are connected in one side of the plug circuit. When a current passes from the battery 72 through the said magnets, the circuits of the lamps 73 are broken by the operation of the armatures 74 which open the circuits when the telephone receivers are off the hooks at the subscribers' stations which are connected by the plugs and their circuits. A current then passes from the battery 72 through the magnets 68 and 71, and coil 67, the tips of the plugs, the subscribers' stations to the collars of the plugs and to the other side of the battery 72. When either receiver is placed on the hook thus breaking the circuit through the magnet 68 or 71, the said magnet becomes deënergized and the current is allowed to pass through a lamp 73. This signals to the operator that that subscriber has completed the conversation and that the corresponding plug should be withdrawn.

In the form of invention illustrated in Fig. 8, I have shown a second indicator which is to be used in place of clearing signals. The clearing out indicator is exactly the same in construction as that described above. The system used in connection with such an indicator is illustrated in Fig. 8. In this system the connections at the subscribers' stations and the connections with the contacts of the jacks are the same. The plugs are connected to the battery 72 through repeating coils 67 in the same way that it is done in the system illustrated in Fig. 7. In the system shown in Fig. 8, the parts leading to the ground 34 of the system of Fig. 7, are connected together by the conductor 54. High resistance impedance coils 67, 67 are, however, used in the system illustrated in Fig. 8 for the purpose hereinafter described. The plug indicator is the same as that described above and which is used to indicate the number of the calling subscriber. In this indicator, however, the plate 12 is provided with as many contacts as there are plugs at any one board and the dial 19 has numbers which correspond to the said contacts and to the numbers of the plugs. In the plug indicator the contacts 13 are connected to one side of the cord circuit leading to each plug otherwise the connections of the indicator are exactly the same as that in Fig. 7 and described above, that is, the contact 11 which is mechanically connected to the pointer is connected to the battery 45 which is in turn connected to the relay magnet 46 and to the ground 79. In the subscriber's station, the switch hook is provided with a second contact which is connected to the ground marked 79 so that when the receiver is on the switch hook a connection will be established to the ground.

After a connection has been established by means of the plugs in the manner described above and after the conversation is completed, a subscriber places his receiver on the hook and a circuit is thereby established from the ground 79, through the hook 28, ring 37, sleeve of the plug 40, connection 81, and contact 13. When the contact 11 reaches the contact 13 a circuit is completed through the contact 11, the battery 45 and the relay magnet 46 to the ground 79. This causes the magnet 46 to close a circuit from the battery 48 through the armature 47 of the magnet, to magnet 10 back to the battery 48. The magnet 10 raises the armature 9, releases the contact 11 from the motor 2 and brings the contact and the pointer to a standstill. The number pointed out by the pointer on the dial corresponding to the number of the plug, which is connected to the contact 13, will inform the operator that the subscriber connected to the said plug has completed his conversation and the operator will immediately withdraw the plug. The contact 11 will continue its motion until it reaches another contact 13 which is connected with a plug which has been used to connect other subscribers who have completed their conversation and the said pointer will again come to a standstill. The operator will also pull out that plug. It will finally reach the contact 13 which is connected with the plug 35 and if the subscriber has placed his receiver on the hook 24, a circuit will be established as before and the contact 11 and the pointer 18 will again come to a standstill and the operator will withdraw the plug 35, thus bringing the circuits of the two subscribers' stations to their normal condition.

The invention may be modified in its details by those skilled in the art without departing from the spirit thereof.

What I claim as new and desire to secure by Letters Patent is as follows:

1. In an indicator the combination of a plurality of jacks, a plurality of lines connected to the said jacks, plugs for connecting the said jacks, an indicating means to indicate any one of the said jacks, means connected to each line for causing the indicator to indicate one of two jacks connected by plugs and means for restoring the said indicator.

2. In an indicator the combination of a plurality of lines, a jack connected to each of the said lines, an indicating device adapted to move in proximity to the said jacks, means for causing the said indicating device to stop at a jack, plugs for connecting the said jacks and adapted to restore the said indicating device.

3. In an indicator the combination of a plurality of lines, a jack connected to each of said lines, an indicating device adapted to move continuously in proximity to said jacks, means for causing the said indicating device to stop at a jack, plugs for connecting the said jacks and adapted to liberate the said indicating device.

4. In an indicator the combination of a panel, a plurality of jacks located in a circle in the said panel, a plurality of plugs for connecting the said jacks, a normally rotating shaft, a pointer normally connected to the said rotating shaft, an electro-magnetic means for disconnecting the said pointer from the said shaft when the said pointer points toward the jack of a calling subscriber and the said plugs adapted to permit the said pointer to be re-connected to the said shaft and to continuously rotate and pass the said jack until it points toward another jack of another calling subscriber.

5. In an indicator the combination of a panel, a plurality of jacks located in the said panel, a normally rotating shaft, an indicator normally connected to the said rotating shaft, means for disconnecting the said pointer from the said shaft when the said pointer points toward a jack, a plurality of plugs for connecting the said jacks and adapted to permit the said pointer to reconnect with the said shaft when one of the said plugs is inserted in the jack of a calling subscriber.

6. In an indicator the combination of a plurality of jacks, indicating means for indicating the jack of a calling subscriber, a constantly moving body connected to the said indicating means, means for disconnecting the said indicating means from the said moving body upon indicating a jack, plugs adapted to connect the said jacks and to permit a reconnection between the said indicating means and the said constantly rotating body.

In testimony whereof, I have signed my name to this specification, in the presence of two subscribing witnesses.

EDWARD J. BURKE.

Witnesses:
  FAUST F. CRAMPTON,
  V. N. HOPPING.